United States Patent [19]

Miyakawa et al.

[11] 4,287,282

[45] Sep. 1, 1981

[54] COMPOSITE MAGNETIC DEVELOPER

[75] Inventors: Nobuhiro Miyakawa, Kobe; Takashi Teshima, Amagasaki, both of Japan

[73] Assignee: Mita Industrial Company Limited, Osaka, Japan

[21] Appl. No.: 110,821

[22] Filed: Jan. 10, 1980

[30] Foreign Application Priority Data

Jan. 11, 1979 [JP] Japan .................................. 54/1013

[51] Int. Cl.$^3$ ......................... G03G 9/00; C04B 35/04

[52] U.S. Cl. .................................... 430/107; 430/110; 430/111; 252/62.54

[58] Field of Search ............... 430/107, 108, 109, 110, 430/111; 252/62.54, 62.57

[56] References Cited

U.S. PATENT DOCUMENTS 3,349,703 10/1967 Varron et al. ..................... 427/14.1

*Primary Examiner*—Mary F. Downey

*Attorney, Agent, or Firm*—Sherman & Shalloway

[57] ABSTRACT

Disclosed is a composite magnetic developer which consists essentially of a homogeneous intimate mixture comprising a plurality of electrically insulating magnetic particulate developers comprising a binder medium and a finely divided magnetic material dispersed in the binder medium, in which the difference of the dielectric constant between the developers is in the range of from 0.2 to 0.85.

This composite magnetic developer can provide a clear transferred image having a high density on a transfer sheet such as plain paper, and even if the copying operation is conducted continuously for a long time by using this developer, excellent transferred images can be obtained without substantial change of the composition of the composite developer or substantial reduction of the image density.

7 Claims, No Drawings

COMPOSITE MAGNETIC DEVELOPER

BACKGROUND OF THE INVENTION (1) Field of the Invention

The present invention relates to a novel composite one-component type magnetic developer. More particularly, the present invention relates to a composite one-component type magnetic developer which can form on a plain paper a clear transferred image having a high density.

(2) Description of the Prior Art

One-component type magnetic developers consisting of particles comprising a finely divided magnetic material dispersed in a binder medium have been used widely in the field of electrophotographic reproduction because any particular magnetic carrier need not be incorporated in these developers at the step of magnetic brush development. In a one-component type magnetic developer of the type used most frequently in the art, the surfaces of the developer particles are rendered electrically conductive so as to prevent the edge effect and fogging. However, if an electrically conductive magnetic developer of this type is transferred onto a copy paper having a relatively low electric resistance such as a plain paper, only an obscure image having broadened contours is obtained. This is a fatal defect of developers of this type.

It has already been known that a one-component type magnetic developer having a high electric resistance is used as the one-component type magnetic developer. For example, the specification of U.S. Pat. No. 3,645,770 discloses a process in which a magnetic brush of a one-component type magnetic developer having a high electric resistance is charged by corona discharge and an electrostatic latent image is developed by the charged magnetic brush of the magnetic developer. However, this process is still insufficient in various points. For example, it is very difficult to charge the magnetic brush uniformly, and a special charging mechanism should be arranged in the development apparatus zone and the development apparatus becomes complicated. Furthermore, the charging mechanism is readily contaminated with the developer and troubles are often caused by contamination of the charging mechanism.

Recently, there have been proposed a process in which an electrically non-conductive developer is charged by frictional contact with the surface of a support carrying thereon an electrostatic latent image to visualize the latent image by the thus charged developer (see Japanese Patent Application Laid-Open Specification No. 62638/75) and a process in which development is accomplished by dielectric polarization of an electrically non-conductive developer (see Japanese Patent Application Laid-Open Specification No. 133028/76). These processes, however, are still insufficient.

In the former process, the development conditions should be strictly controlled. More specifically, if the development conditions are not strictly controlled, fogging is readily caused in non-image areas (especially conspicuous when the degree of contact between the surface of a photosensitive material and the top ends of spikes of magnetic toner particles is high), and magnetic toner particles are fixed to a development sleeve and blocking of the toner particles is readily caused. Occurrence of these troubles is especially serious when the copying operation is performed continuously.

In the latter process, the trouble of fogging is not serious, but since a visible image is formed by utilization of a dielectric polarizing effect induced in the magnetic toner to an electrostatic latent image, a low-potential part of the latent image area is not effectively developed and therefore, the obtained copy has a hard tone and it is impossible to reproduce a half-tone in prints.

Moreover, images of prints obtained according to these conventional processes are poor in sharpness and according to these conventional processes, it is very difficult to form images having a sufficiently high density.

As another one-component type magnetic developer, there has been proposed a composite magnetic developer consisting of a homogeneous mixture comprising a magnetic developer having a high electric resistance and an electrically conductive magnetic developer. Furthermore, a composite developer consisting of a homogeneous mixture comprising a magnetic developer and a non-magnetic developer. However, these known composite developers are defective in that the composition is gradually changed while the copying operation is conducted continuously and the density of transferred images is considerably reduced.

OBJECTS OF THE INVENTION

It is a primary object of the present invention to provide a novel composite one-component type magnetic developer which can form on transfer sheets composed of plain paper clear transferred images having a high density even if the copying operation is conducted continuously.

Another object of the present invention is to provide a composite magnetic developer which does not require a particular charging mechanism or strict development conditions for development of electrostatic latent images and which can form on an uncoated plain paper a clear transferred image having a high density.

Still another object of the present invention is to provide a composite magnetic developer in which by mutual friction among particles of a plurality of component developers, the particles are effectively charged and no substantial change of the composition or no substantial reduction of the image density is caused even if the copying operation is conducted continuously for a long time.

SUMMARY OF THE INVENTION

It has been found that in preparing a composite magnetic developer by mixing a plurality of one-component type magnetic particulate developers comprising a finely divided magnetic material in a binder medium, if developers to be combined are selected so that the difference of the dielectric constant ($\epsilon$), described in detail hereinafter, between the developers is 0.2 to 0.85, charging is most effectively accomplished by mutual friction of the developer particles and clear images having a high density can be formed continuously in succession by the combination of the developers, each of which fails to provide a clear image when used singly.

Furthermore, when this composite one-component type magnetic developer according to the present invention is used, strict control of development conditions is not necessary and even if the copying operation is conducted continuously for a long time, excellent transferred images can be obtained without substantial change of the composition or substantial reduction of the image density.

In accordance with the present invention, there is provided a composite magnetic developer which consists essentially of a homogeneous intimate mixture comprising a plurality of electrically insulating magnetic particulate developers comprising a binder medium and a finely divided magnetic material dispersed in the binder medium, wherein said developers are selected so that the difference of the dielectric constant (ε), as measured under conditions of an electrode spacing of 0.65 mm, an electrode sectional area of 1.43 cm$^2$ and an inter-electrode load of 105 g/cm$^2$, between said developers is in the range of from 0.2 to 0.85.

DETAILED DESCRIPTION OF THE PREFERRED EMBODIMENTS

When a magnetic brush (composed of developer particles) of a one-component type magnetic developer is contacted with the surface of a support carrying an electrostatic latent image thereon, respective developer particles undergo an electrostatic attracting force (Coulomb force) acting between the developer particles and an electrostatic static image and a magnetic attracting force acting between the developer particles and a magnetic brush-forming magnet (developing sleeve). Accordingly, developer particles on which the Coulomb force is larger are attracted to the electrostatic latent image and developer particles on which the magnetic attracting force is larger are attracted to the developing sleeve, and development is effected according to the charge on the electrostatic latent image formed on the support.

The most characteristic feature of the present invention resides in the finding that as described hereinbefore, when a plurality of one-component type magnetic particulate developers are used in combination so that the difference of the dielectric constant (ε) between them is in the range of from 0.2 to 0.85, preferably from 0.25 to 0.8, particularly preferably from 0.3 to 0.7, the developer particles can be charged very easily by mutual friction among the developer particles and are attracted to an electrostatic latent image to form a visible image having a remarkably high density.

More specifically, as is seen from data of sample A of Example 1 given hereinafter, when a one-component type magnetic developer having a dielectric constant of 5.49 and an electrostatic capacity of 10.7 PF (picofarad) is used singly, a transferred image having an image density of 0.33 is obtained, and as is seen from data of sample B of Example 1, when a one-component type magnetic developer having a dielectric constant of 5.08 and an electrostatic capacity of 9.9 PF is used singly, a transferred image having an image density of 0.32 is obtained. On the other hand, in case of a composite developer (sample E) which is formed by combining these developers so that the difference of the dielectric constant is 0.41, there can be obtained a transferred image having such a high image density as cannot be expected from the single use of each of the foregoing developers, that is, 1.65. In contrast, in case of a composite developer (sample F) formed by combining the above-mentioned one-component type magnetic developer (sample A) and another one-component type magnetic developer (sample C) so that the difference of the dielectric constant (ε) is smaller than 0.2 or a composite developer (sample G) formed by combining the above-mentioned one-component type magnetic developer (sample A) and another one-component type magnetic developer (sample D) so that the difference of the dielectric constant (ε) is larger than 0.85, increase of the image density cannot be attained.

It has not been elucidated completely why by combining a plurality of one-component type developers so that the difference of the dielectric constant (ε) is within the above-mentioned specific range, images having such a high image density as cannot be expected from the single use of each of these developer can be obtained. However, we tentatively consider that such excellent effect will be attained for the following reason.

In order to form a transferred image having a high density by using a one-component type magneric developer, it is necessary that a sufficient quantity of the developer should be attracted to an electrostatic latent image formed on an electrophotographic sensitive plate by the Coulombic force and the developer deposited on the electrostatic latent image should be transferred onto a transfer sheet at a high transfer efficiency. Accordingly, in order to obtain a developed image having a sufficient density, it is first necessary that the magnetic developer should have a charge sufficient for the developer to be attracted to the electrostatic latent image. It is construed that when a plurality of magnetic developers, which fail to provide images having a sufficient density when used singly, are combined according to the present invention so that the difference of the dielectric constant is within the specific range, frictional charging will probably be effected so that the developers can be effectively attracted to electrostatic latent images, whereby transferred images having a high density can be obtained.

It is known that a polymeric material having a high dielectric constant is readily charged positively by frictional charging (see The Society of Photographic Scientists and Engineers, 2nd Int. Conf., 1974, pages 95–100). We found that also in magnetic materials comprising a powder of a magnetic material dispersed in a binder medium, when the dielectric constant is low, the magnetic developers are frictionally charged negatively and when the dielectric constant is high, the magnetic developers are frictionally charged positively. Finally, we found that when a plurality of such magnetic developers are combined so that the difference of the dielectric constant is within the above-mentioned specific range, there can be obtained a composite magnetic developer having electric characteristic suitable for development of electrostatic latent images and subsequent electrostatic transfer of developed images.

The dielectric constants of individual magnetic developers to be combined can easily be controlled by selecting a binder medium composed of a polymeric material having a certain dielectric constant, that is, a frictional charge row within a certain range. Furthermore, the dielectric constant of the magnetic developer can be reduced by decreasing the amount of the magnetic material or incorporating a charge controlling agent capable of maintaining a negative charge. In contrast, the dielectric constant can be increased by increasing the amount of the magnetic material or incorporating an electrically conductive material such as carbon or a charge controlling agent capable of maintaining a positive charge. Moreover, the dielectric constant may be increased by incorporation of a substance having a high dielectric constant, such as $TiO_2$ or $BaTiO_3$, if desired. By adoption of the foregoing means, the dielectric constants of the magnetic developers to be combined can be changed, and in preparing composite developers by intimately and homogeneously mixing at least two magnetic developers, the frictional charge characteristics based on the difference of the dielectric constant between the developers can freely be controlled by changing the mixing ratio of the developers. This is another characteristic feature of the present invention.

In the composite developer according to the present invention, in order to transfer developed images at a high transfer efficiency onto transfer sheets having a low electric resistance such as plain paper without broadening of contours or blurring, it is preferred that the volume resistivity, as measured under the same conditions as adopted for determination of the dielectric constant, of each of the individual developers be at least $5\times10^{13}$ Ω-cm, especially $1\times10^{14}$ to $1\times10^{16}$ Ω-cm, and that the volume resistivity of the resulting intimate homogeneous mixture be at least $5\times10^{13}$ Ω-cm, especially $1\times10^{14}$ to $1\times10^{16}$ Ω-cm.

Since there is a tendency that the number of developer particles attracted to an electrostatic latent image of a certain charge increases as the electrostatic capacity of the developer particles is small, in the composite magnetic developer of the present invention, it is preferred that the intimate homogeneous mixture should have a relatively low electrostatic capacity. That is, it is preferred that the electrostatic capacity of the intimate homogeneous mixture of the magnetic developers, as determined under the same conditions as adopted for determination of the dielectric constant, be 7.8 to 15 PF, especially 8 to 14 PF.

Waxes, resins and rubbers showing an appropriate adhesiveness under application of heat and pressure, and mixtures thereof may be used as the binder medium. In view of the flowability and non-agglomerating property of developer particles, resins and compositions comprising a resin as a main component and a wax or the like are preferred as the binder medium.

As resins that can be preferably used in the present invention, there can be mentioned, for example, homopolymers and copolymers of ethylenically unsaturated monomers, polyamide resins, polyester resins, polycarbonate resins, epoxy resins, phenolic resins, phenoxy resins, polyurethane resins, alkyd resins, petroleum resins and rosins. As polymers of ethylenically unsaturated monomers, there can be mentioned, for example, polystyrene, polyvinyl-toluene, acrylic resins, styrene/acrylic monomer copolymers and styrene/butadiene copolymers. It must be understood that these resins are mentioned by way of example and any of various resins customarily used as binder resins in the art can be used in the present invention, so far as the above-mentioned requirement is satisfied.

As the finely divided magnetic material, there have heretofore been used triiron tetroxide ($Fe_3O_4$), diiron trioxide ($\gamma$-$Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron power (Fe), cobalt powder (Co) and nickel powder (Ni). These magnetic materials may be used in the present invention singly or in the form of a mixture of two or more of them. Triiron tetroxide and $\gamma$-diiron trioxide are especially preferred for attaining the objects of the present invention.

In the composite magnetic developer of the present invention, the finely divided magnetic material may be present in an amount of 65 to 230 parts by weight, preferably 80 to 190 parts by weight, per 100 parts by weight of the binder medium. In order to control the change of the composition or the reduction of the image density when the copying operation is conducted continuously for a long time, it is preferred that in all the component developers to be combined, the mixing ratio of the finely divided magnetic material be substantially the same, and it is ordinarily preferred that variations of amounts of the magnetic materials in the component developers to be combined be within the range of $\pm5$ parts by weight.

The dielectric constant of each component developer varies according to the kind of the resin constituting the binder medium. Accordingly, in the present invention, one-component magnetic particulate developers are prepared by using various resins as the binder medium, the dielectric constants of the developers are measured and a plurality of the magnetic developers are combined so that the difference of the dielectric constant is within the above-mentioned range. Preferred combinations of resin media for formation of composite developers are as follows, though applicable combinations are not limited to those mentioned below: styrene/acrylic monomer copolymer-polystyrene, styrene/acrylic monomer copolymer-acrylic resin, styrene/acrylic monomer copolymer-polyester, epoxy resin-polyester, acrylic resin-polyester, styrene/acrylic monomer copolymer-polyamide, acrylic resin-polyamide and epoxy resin-polyamide.

Various acrylic resins derived from at least one of many acrylic monomers, such as acrylic acid, methacrylic acid, ethyl acrylate, methyl methacrylate, butyl acrylate, butyl methacrylate, 2-ethylhexyl acrylate, 2-ethylhexyl methacrylate, 3-hydroxypropyl acrylate, 2-hydroxyethyl methacrylate, 3-aminopropyl acrylate, 3-N,N-diethylaminopropyl acrylate and acrylamide, are known. Of course, binder media may be chosen from these acrylic resins so that the difference of the dielectric constant is within the above-mentioned range. This holds good with respect to other resins comprising a variety of constituent monomers, such as polyamides, polyesters and vinyl copolymers.

The dielectric constants of components developers to be combined are changed by addition of a charge control agent into the binder medium or according to the kind of the charge control agent. For example, a positive charge control agent is effective for increasing the dielectric constant of the developer and a negative charge control agent has an action of decreasing the dielectric constant of the developer. Accordingly, even if one resin is commonly used as the binder medium for all the component developers, by incorporating a certain charge control agent in one component developer or incorporating different charge control agents in both the component developers, respectively, the difference of the dielectric constant can be adjusted within the above-mentioned range.

Known positive charge control agents, especially oil-soluble dyes, can be used. As the oil-soluble dye, there can be mentioned, for example, C.I. Solvent Black 1, C.I. Solvent Black 2, C.I. Solvent Black 3, C.I. Solvent Black 5 and C.I. Solvent 7. Known negative charge control agents, especially metal-containing dyes, can be used. As the metal-containing dye, there can be mentioned, for example, chromium-incorporated C.I.

Acid Black 123, C.I. Solvent Black 22, C.I. Solvent Black 23, C.I. Solvent Black 28, C.I. Solvent Black 42 and C.I. Solvent Black 43. Such charge control agent may be incorporated in an amount of 0.1 to 5% by weight based on the binder resin.

Developer particles may be prepared according to known methods, for example, the kneading-pulverization method and the spray granulation method. For instance, the resin binder is kneaded with the finely divided magnetic material by a heating roll or kneader while the resin binder is softened or molten, and the kneaded mixture is cooled, pulverized and, if desired, classified to obtain an intended developer. Furthermore, a developer having a desirable particle size can be obtained by dissolving the binder resin in an appropriate solvent, dispersing the finely divided magnetic material in the solution and spraying the dispersion in a drying atmosphere.

In each of the foregoing methods, known auxiliary components for a developer may be incorporated according to known recipes prior to granulation. For example, in order to improve the hue of the developer, pigments such as carbon black and dyes such as Nigrosine may be incorporated singly or in the form of a mixture of two or more of them in an amount of 0.5 to 5% by weight based on the developer as a whole. Furthermore, in order to attain a filling effect, a filler such as calcium carbonate or finely divided silica may be incorporated in an amount of up to 20% by weight based on the developer as a whole. When a fixing method using a hot roll is adopted, an offset preventing agent such as a silicone oil, a low-molecular-weight olefin resin or a wax may be used in an amount of 2 to 15% by weight based on the developer as a whole. When a fixing method used a pressure roll is adopted, an agent for improving the adaptability to pressure fixation, such as paraffin wax, an animal or vegetable wax, a higher fatty acid or a fatty acid amide may be used in an amount of 5 to 30% by weight based on the developer as a whole. Moreover, in order to prevent agglomeration of developer particles and improve the flowability thereof, a flowability improving agent such as finely divided polytetrafluoroethylene or silica may be incorporated in an amount of 0.1 to 1.5% by weight based on the developer as a whole.

It is preferred in the present invention that particles of each component developer should have a particle size of 5 to 40 microns, and it is especially preferred that the developer be composed of particles having an indeterminate shape, which are prepared by the pulverization method.

According to the present invention, magnetic developer particles (A) having a relatively high dielectric constant and magnetic developer particles (B) having a relatively low dielectric constant, which have been prepared according to the above-mentioned procedures, are combined so that the difference of the dielectric constant ($\epsilon$) is within the above-mentioned range, and they are mixed intimately and homogeneously. Ordinarily, this mixing can be accomplished by dry blending, and if desired, the resulting mixture may be lightly ball-milled so as to adjust the particle size. At this step, a small amount of a flowability improving agent may be incorporated. The mixing ratio of the particles (A) and the particles (B) is changed according to the kind of a photosensitive plate carrying an electrostatic latent image thereon. However, in order to prevent change of the composition or reduction of the image density while the copying operation is conducted continuously, it is preferred that for negative electrostatic latent images, the weight ratio of particles (A): particles (B) be from 1:0.08 to 1:1, especially from 1:0.1 to 1:0.5. For positive electrostatic latent images, good results are obtained when the abovementioned weight ratio relation between the particles (A) and the particles (B) is reversed.

In the present invention, an electrostatic latent image may be formed according to any of known methods. For example, there may be adopted a method in which a photoconductive layer on an electrically conductive substrate is uniformly charged and is then exposed imagewise to form an electrostatic latent image.

The surface of the substrate having the so formed electrostatic latent image thereon is caused to fall in contact with a magnetic brush of the above-mentioned composite one-component type magnetic developer to form a visible image of the developer.

The developer image formed on the substrate is caused to fall in contact with a transfer sheet and corona discharge of the same polarity as that of the above-mentioned electrostatic latent image is applied from the back of the transfer sheet to transfer the developer image onto the transfer sheet.

For fixation of the transferred image, an appropriate fixing method is appropriately selected from known methods such as hot roller fixation, flash lamp fixation and pressure roller fixation according to the kind of the developer used.

The present invention will now be described in detail with reference to the following Examples that by no means limit the scope of the invention.

EXAMPLE 1

By a hot roll mill, 55 parts by weight (all of "parts" given hereinafter are by weight) of $Fe_3O_4$ (Black Iron manufactured by Toyo Shikiso Kogyo K.K.) as a magnetic material and 45 parts of a thermoplastic resin (selected from four thermoplastic resins described below) were molten and kneaded, and the kneaded mixture was naturally cooled and roughly pulverized by a cutting mill to obtain coarse particles having a size of 0.5 to 2 mm. Then, the coarse particles were finely pulverized by a jet mill and classified by a zigzag classifier to obtain a magnetic toner.

The following thermoplastic resins were used.

Sample A:

Epoxy resin (AER 667 manufactured by Asahi Kasei K.K.)

Sample B:

Polyester resin (RX-K2 manufactured by Kao-Atlas K.K.)

Sample C:

Epoxy resin (Epikote 1004 manufactured by Shell Chemicals)

Sample D:

Acrylic resin (Aron S-1060 manufactured by Toa Gosei Kagaku Kogyo K.K.)

Incidentally, in sample C, the thermoplastic resin was used in an amount of 40 parts per 60 parts of the magnetic material.

The dielectric constant of each magnetic toner was determined under conditions of an electrode spacing of 0.65 mm, an electrode sectional area of 1.43 $cm^2$ and an inter-electrode load of 105 $g/cm^2$. Obtained results are shown in Table 1.

Separately from the foregoing 4 magnetic toners, composite toners (samples E, F and G) were prepared by mixing samples A and B, samples A and C and samples A and D, respectively. In each case, the mixing weight ratio of the two samples was 1:1.

The copying test was carried out in the following manner by using the so prepared 7 magnetic toners.

In a copying machine having a selenium drum as a photosensitive member, the magnetic toner was applied to a developing roller having a magnet attached to the interior thereof through a non-magnetic member while adjusting a spike-cutting plate and the developing toner to 0.3 mm. The distance between the surface of the photosensitive member and the developing roller was adjusted to 0.5 mm, and the developing roller was moved in the same direction as the moving direction of the photosensitive member at a moving speed 2 times the moving speed of the photosensitive member. Under these conditions, charging, exposure, development and transfer were conducted. High quality paper having a thickness of 80μ was used as transfer sheet. Physical properties of the respectively toners and results of the copying test are shown in Table 1. Incidentally, the image density in Table 1 is a value obtained with respect to the shear black area.

TABLE 1

| Sample | Dielectric Constant | Electrostatic Capacity (PF) | Difference of Dielectric Constant between Toners | Image Density |
|---|---|---|---|---|
| A | 5.49 | 10.7 | — | 0.33 |
| B | 5.08 | 9.9 | — | 0.32 |
| C | 5.64 | 11.0 | — | 0.20 |
| D | 4.62 | 9.0 | — | 0.59 |
| E (present invention) | — | — | A-B, 0.41 | 1.65 |
| F | — | — | C-A, 0.15 | 0.19 |
| G | — | — | A-D, 0.87 | 0.17 |

The composite magnetic toner (Sample E) of the present invention in which the difference of the dielectric constant was 0.41 provided a copy having a higher image density than those of copies obtained by the single toners or the composite toners in which the difference of the dielectric constant was 0.15 or 0.87.

A composite developer was prepared in the same manner as described above by using samples A and B at a weight ratio of 0.5/l and the copying test was carried out under the same conditions as described above by using the so prepared composite toner. A copy having an image density of 1.60 was obtained. Furthermore, a composite toner prepared by combining samples B and D (the difference of the dielectric constant was 0.46) provided a copy having an image density of 1.64.

EXAMPLE 2

In the same manner as described in Example 1, magnetic toners were prepared by using the following 3 thermoplastic resins and the copying test was carried out.

Sample H:

Styrene/2-vinylpyridine/2-ethylhexyl acrylate copolymer

Sample I:

Polystyrene (Piccolastic D-125 manufactured by Esso Standard Co.)

Sample J:

Equal amount mixture of resins of samples H and I (formed by melting and kneading both the resins at a weight ratio of 1:1)

Physical properties of the resulting toners are shown in Table 2. Results of the copying test made on these 3 toners and composite magnetic toners prepared by mixing the toners of samples H and I at various mixing ratios (the difference of the dielectric constant was 0.77) are shown in Table 3.

TABLE 2

| Sample | Volume Resistivity ( 106 -cm) | Dielectric Constant | Electrostatic Capacity (PF) |
|---|---|---|---|
| H | $3.6 \times 10^{14}$ | 4.92 | 9.6 |
| I | $6.1 \times 10^{14}$ | 4.15 | 8.1 |
| J | $5.4 \times 10^{14}$ | 4.79 | 9.3 |

TABLE 3

| | Image Density |
|---|---|
| Sample H | 0.24 |
| Sample I | 0.41 |
| Sample J | 0.25 |
| Sample H/Sample I Mixing Ratio | |
| 10/1 | 0.77 |
| 10/3 | 0.87 |
| 10/5 | 1.56 |
| 5/10 | 1.71 |
| 3/10 | 1.73 |
| 1/10 | 1.77 |

Even if a magnetic toner prepared by using a polymer blend formed by melting and kneading two resins was used, the image density could not be improved (see sample J). In contrast, a composite magnetic toner formed by mixing 2 composite magnetic toners (samples H and I) could provide prints having a high image density.

In case of the composite toner formed by mixing the toners of samples H and I at a weight ratio of 10/5, the image density was gradually reduced when a great number of copies were formed in a continuous manner.

EXAMPLE 3

In the same manner as described in Example, 1 magnetic toners were prepared by using the following thermoplastic resins and the copying test was carried out.

Sample K:

Styrene/acrylic monomer copolymer (Himer SBM-73 manufactured by Sanyo Kasei K.K.)

Sample L:

Polyamide resin (Versamid 940 manufactured by Japan General Mills Chemicals K.K.)

Composite magnetic toners (samples M, N, O, P and Q) were prepared by mixing the two magnetic toners described in Table 4 at a weight ratio of 1:1, and they were subjected to the copying test in the same manner as described in Example 1.

Physical properties of the respective magnetic toners and test results are shown in Table 4.

TABLE 4

| Sample | Dielectric Constant | Electrostatic Capacity (PF) | Difference of Dielectric Constant between Toners | Image Density |
|---|---|---|---|---|
| K | 4.74 | 9.25 | — | 0.63 |
| L | 4.62 | 9.0 | — | 0.18 |
| M(K/I) | — | — | K-I, 0.59 | 1.68 (present |

TABLE 4-continued

| Sample | Dielectric Constant | Electrostatic Capacity (PF) | Difference of Dielectric Constant between Toners | Image Density |
|---|---|---|---|---|
| | | | | invention) |
| N(H/L) | — | — | H-L, 0.30 | 1.49 (present invention) |
| O(B/K) | — | — | B-K, 0.34 | 1.30 (present invention) |
| P(K/L) | — | — | K-L, 0.12 | 0.46 |
| Q(C/K) | — | — | C-K, 0.90 | 0.34 |

The composite magnetic toners in which the difference of the dielectric constant was within the range specified in the present invention provided prints having a high image density, but the composite magnetic toners in which the difference of the dielectric constant was outside the range specified in the present invention provided prints having a low density and no improvement was attained.

EXAMPLE 4

To a mixture of 45 parts of an acrylic resin (X-106 manufactured by Ionac Chemicals Co.) and 55 parts of a magnetic material ($Fe_3O_4$, Toda Color KN-320 manufactured by Toda Kogyo K.K.) was added 1.8 parts of Spiron Black BH (manufactured by Hodogaya Kagaku Kogyo K.K.) as the negative charge control agent or Nigrosine Base EX (Orient Kagaku Kogyo K.K.) as the positive charge control agent, and in the same manner as described in Example 1, a magnetic toner was prepared by using the resulting mixture and subjected to the copying test.

Physical properties of the magnetic toners are shown in Table 5.

TABLE 5

| Sample | Charge Control Agent | Dielectric Constant |
|---|---|---|
| R | not added | 4.26 |
| S | negative | 4.15 |
| T | positive | 4.46 |

Image densities of the obtained prints were 0.18 in case of sample R, 0.41 in case of sample S and 0.18 in case of sample T. In case of the composite toner formed by mixing samples S and T at a weight ratio of 1:1 (the difference of the dielectric constant was 0.31), the image density of the obtained print was 1.61.

When spherical magnetic toners having a particle size of 5 to 25μ were prepared from the compositions of samples R, S and T according to the spray dry method and they were subjected to the copying test, it was found that the dielectric constants were increased by 1.51, 1.52 and 1.58, respectively, but the image density was not substantially changed. On the other hand, in the composite magnetic toner (the difference of the dielectric constant was 0.37), the image density was 1.65.

For formation of spherical toners, toluene was used as the solvent and a dispersion having a solid content of 34.5% by weight was prepared and agitated. The dispersion was spray-dried at a nozzle pressure of 5.5 $Kg/cm^2$ and a drying temperature of 140° C. while adjusting the temperature and viscosity of the dispersion to 64° C. and 35 cP, respectively.

When the magnetic toner of sample R was independently combined with sample H (the difference of the dielectric constant was 0.66), sample L (the difference of the dielectric constant was 0.36) and sample K (the difference of the dielectric constant was 0.48), the obtained image densities were 1.65, 1.31 and 1.14, respectively. On the other hand, when the magnetic toner of sample C was combined with sample C (the difference of the dielectric constant was 1.38) or sample I (the difference of the dielectric constant was 0.11), the image density was lower than 0.7 and no good results were obtained.

What we claim is:

1. A composite magnetic developer which consists essentially of a homogeneous intimate mixture comprising a plurality of electrically insulating magnetic particulate developers, each developer comprising a binder medium and a finely divided magnetic material dispersed in the binder medium, wherein the difference of the dielectric constant (ε), as measured under conditions of an electrode spacing of 0.65 mm, an electrode sectional area of 1.43 $cm^2$ and an inter-electrode load of 105 $g/cm^2$, between said developers is in the range of from 0.2 to 0.85.

2. A composite magnetic developer as set forth in claim 1 wherein each of the component developers has a volume resistivity of at least $5\times10^{13}$ Ω-cm as measured under the same conditions as adopted for determination of the dielectric constant and said homogeneous intimate mixture has a volume resistivity of at least $1\times10^{14}$ Ω-cm as measured under the same conditions as adopted for determination of the dielectric constant.

3. A composite magnetic developer as set forth in claim 1 wherein said homogeneous intimate mixture has an electrostatic capacity of 7.8 to 15 piccofarad as measured under the same conditions as adopted for determination of the dielectric constant.

4. A composite magnetic developer for developing negative electrostatic latent images, as set forth in claim 1, wherein the homogeneous intimate mixture comprises (A) magnetic developer particles having a relatively high dielectric constant and (B) magnetic developer particles having a relatively low dielectric constant at an (A)/(B) weight ratio of from 1/0.08 to 1/1.

5. A composite magnetic developer for developing positive electrostatic latent images, as set forth in claim 1, wherein the homogeneous intimate mixture comprises (B) magnetic developer particles having a relatively low dielectric constant and (A) magnetic developer particles having a relatively high dielectric constant at a (B)/(A) weight ratio of from 1/0.08 to 1/l.

6. A composite magnetic developer for developing negative electrostatic latent images as set forth in claim 4 wherein the weight ratio (A)/(B) is from 1/0.1 to 1/0.5.

7. A composite magnetic developer for developing positive electrostatic latent images, as set forth in claim 5 wherein the weight ratio (B)/(A) is from 1/0.1 to 1/0.5.

* * * * *